United States Patent [19]

Witzke et al.

[11] Patent Number: 4,925,513
[45] Date of Patent: May 15, 1990

[54] METHOD FOR MANUFACTURING CONTOURED SEATS

[75] Inventors: Duane W. Witzke, Adrian; Alan J. Selbert, Tecumseh; Michael E. Lowe, Saline, all of Mich.

[73] Assignee: Hoover Universal, Inc., Ann Arbor, Mich.

[21] Appl. No.: 259,241

[22] Filed: Oct. 17, 1988

[51] Int. Cl.$^5$ .............................................. B29C 43/04
[52] U.S. Cl. .................................. 156/245; 156/213; 156/214; 156/220; 156/222; 156/308.4; 297/219; 297/452; 297/DIG. 1
[58] Field of Search ............ 156/222, 220, 219, 213, 156/308.4, 245, 214; 297/219, 452, DIG. 1

[56] References Cited

U.S. PATENT DOCUMENTS

| | | | |
|---|---|---|---|
| 2,618,581 | 11/1952 | Lyijynen | 156/220 |
| 3,298,047 | 1/1967 | Feinerman | 297/219 |
| 3,629,034 | 12/1971 | Kuroda | 156/219 |
| 3,666,604 | 5/1972 | Coffet | 156/308.4 X |
| 3,713,696 | 1/1973 | Dudley | 297/DIG. 1 X |
| 3,758,358 | 9/1973 | Kuroda | 156/220 X |
| 4,519,862 | 5/1985 | Urai et al. | 156/219 |
| 4,627,664 | 12/1986 | Okazaki et al. | 297/219 X |
| 4,715,916 | 12/1987 | Shimada | 156/214 |
| 4,740,260 | 4/1988 | Selbert et al. | 156/196 X |

FOREIGN PATENT DOCUMENTS 61-249813 11/1986 Japan .............................. 156/308.4

Primary Examiner—Merrell C. Cashion, Jr.
Assistant Examiner—Michele K. Yoder
Attorney, Agent, or Firm—Harness, Dickey & Pierce

[57] ABSTRACT

A method for making contoured covers for vehicle seats is disclosed. A cover member is attached to a foam sheet which has an adhesive layer covering the face opposite from the cover member. The adhesive layer is in turn covered with a backing material. Portions of the cover member are pressed into the foam sheet, contacting the adhesive. The adhesive bonds the cover member to the backing material forming the contours in the cover. Alternatively the adhesive layer may be omitted if a thermally sensitive backing material is used. In this case the portion of backing material pressed into contact with the cover is partially melted to bond the backing material to the cover.

4 Claims, 2 Drawing Sheets

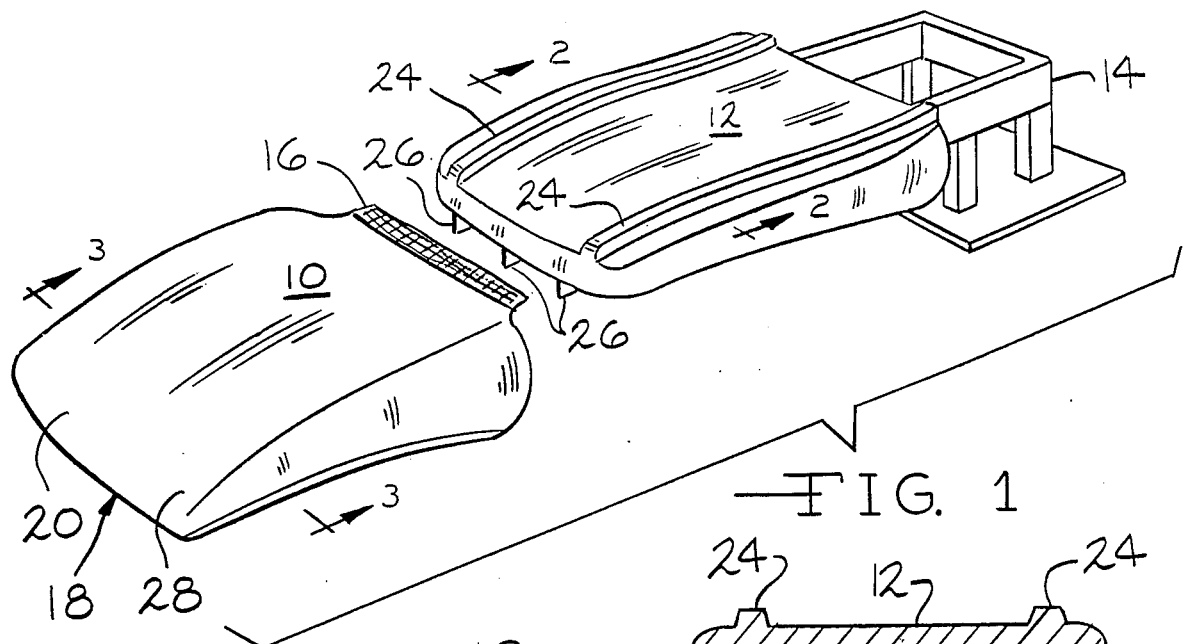
FIG. 1
FIG. 2
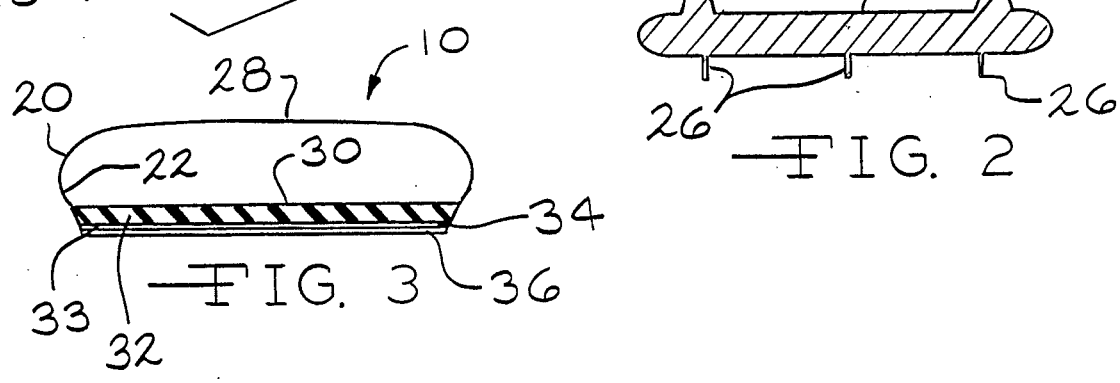
FIG. 3
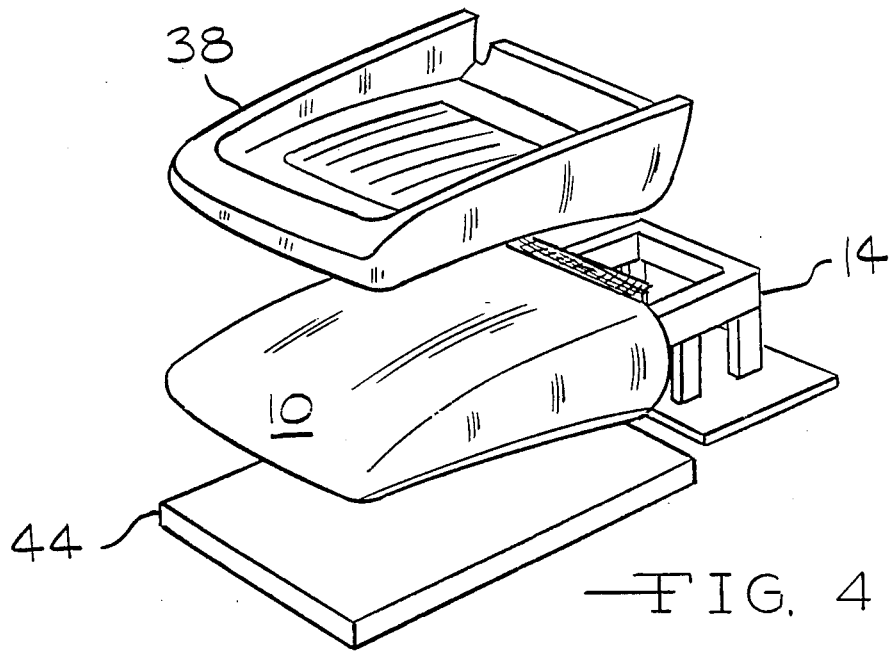
FIG. 4

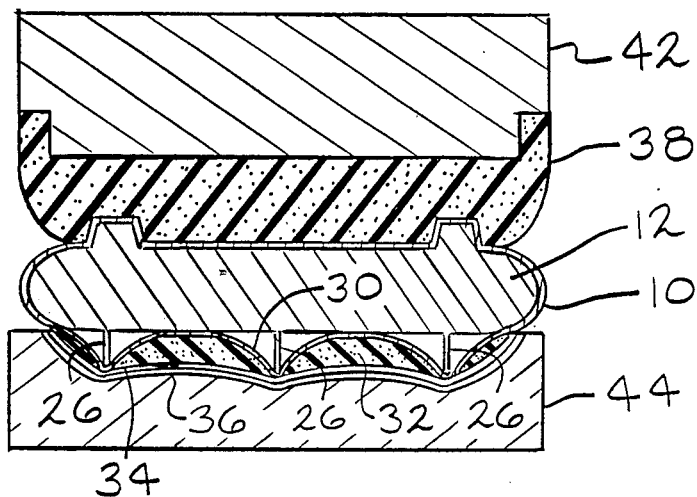
FIG. 5
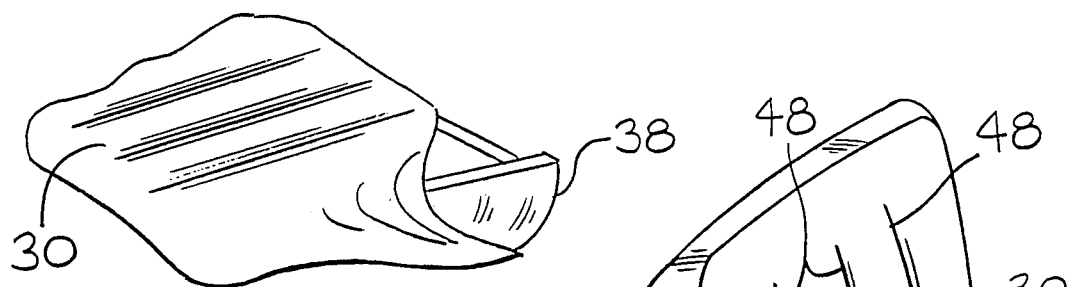
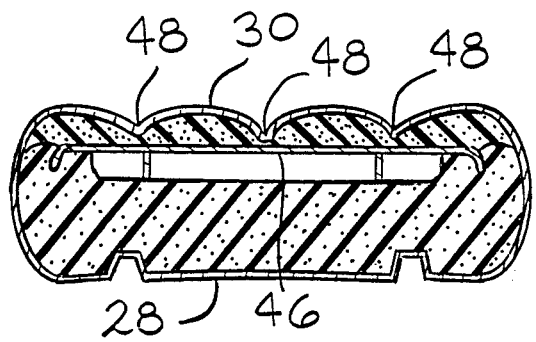
FIG. 6
FIG. 8
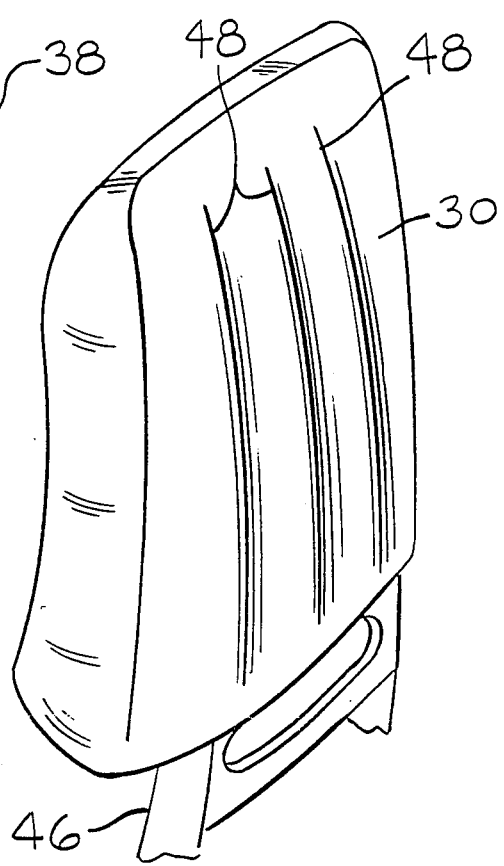
FIG. 7

METHOD FOR MANUFACTURING CONTOURED SEATS

BACKGROUND AND SUMMARY OF THE INVENTION

This invention relates generally to automobile seats and more particularly to automobile seat backs which have heretofore been practically devoid of styling features. This invention enables the manufacturing of seat backs so that style lines are formed in the rear sides of the seat backs.

The article of this invention consists of a cover assembly comprising a generally tubular shaped member having an open and a closed and, an inner side and an outer side. A front panel portion of the cover member forms the front of a seat back cover. A back panel portion forms the back of a seat back cover. A flat foam sheet is adhered to the inner side of the back panel. The foam sheet has a layer of heat activated adhesive on the side opposite the back panel. The adhesive is covered with a backing material. Portions of the foam sheet are compressed such that the back panel contacts the adhesive layer and is bonded to the backing material. This results in the stylelines or contours in the back panel. The front panel is shaped and secured to a foam pad as described in U.S. patent application, Ser. No. 897,481, filed Aug. 18, 1986, now U.S. Pat. No. 4,740,260, entitled Method and Apparatus for Manufacturing Seats and Articles Formed Thereby, assigned to the assignee of this application and incorporated herein by reference.

Production of the contours in the back panel may be accomplished conveniently by a forming tool which is cantilever supported to allow the cover to be telescoped open end first over the free end of the forming tool. The forming tool has a number of downwardly extending ribs which are used to concentrate applied pressure to portions of the back panel, compressing the foam sheet until the back contacts the adhesive and is bonded to the backing material. The ribs form decorative style lines, contours, letters, logos or the like in the surface of the back panel.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of the cantilever forming tool with an envelope cover being mounted thereon;

FIG. 2 is a cross sectional view of the cantilever forming tool as seen from substantially the line 2—2 in FIG. 1;

FIG. 3 is a cross sectional view of the envelope cover as seen form substantially the line 3—3 in FIG. 1;

FIG. 4 is a perspective view, like FIG. 1, showing the envelope cover mounted on the cantilever forming tool with a molded foam pad in position to be adhered to the front panel of the cover and a lower fixture in position to apply pressure to portions of the back panel to form the contours;

FIG. 5 is a cross sectional view of the assembly illustrated in FIG. 5, showing the foam pad being adhered to the front panel and the contours being formed in the back panel;

FIG. 6 is a perspective view of the cover showing the cover being turned inside out so as to enclose the foam pad and sheet;

FIG. 7 is a perspective view showing the cover and pad assembly telescoped over a supporting seat back frame; and FIG. 8 is a cross sectional view of a completed envelope cover telescoped over a supporting seat back frame.

DETAILED DESCRIPTION OF THE DRAWINGS

With reference to the drawings, the envelope cover of this invention, indicated generally at 10, is illustrated in FIG. 1 in a position in which it is about to be supported on a shaped forming tool member 12 that is cantilever supported on a support structure 14. Supporting forming tool 12 in a cantilever fashion is not essential but is particularly suited for forming covers of general tubular shape. The envelope cover member 10 is of a generally tubular shape having an open end 16 and a closed end 18, an inner side 20 and an outer side 22 shown in FIG. 3. In the position of the envelope cover member 10 shown in FIG. 1, the inner side 20 faces outwardly for purposes to appear presently.

The top of forming tool 12 is shaped to provide a desired contour to the front panel portion 28 of the envelope cover 10. Accordingly, forming tool 12 is illustrated as having a pair of upwardly extending U-shaped projections 24 but it is to be understood that the forming tool 12 can be of substantially any shape desired. Forming tool 12 also has three downwardly extending narrow ribs 26 which are used to produce stylized contours in the back panel 30 of the envelope cover. Again it is to be understood that the ribs 26 can be of substantially any shape desired for the back panel 30.

Ribs 26 may be parallel, as shown in FIGS. 1, 2, and 5 or may outline a logo, work, or other decorative design. For illustrative purposes, three parallel ribs 26 are shown although other contours may be used and are within the scope of the present invention.

FIG. 2 shows a cross sectional view of the forming tool 12 with the upwardly extending projections 24 and the downwardly extending ribs 26. FIG. 3 shows a cross section of the envelope cover as it is in position to be telescoped over the forming tool 12. In this position the cover member has been manipulated such that the inner side 20 is facing outwardly and the outer side 22 is facing inwardly. The envelope cover 10 has a front panel 28 which forms the front portion of a seat back assembly, and a back panel 30 which forms the back portion of a seat back assembly. Attached to the inner side 20 of the back panel 30 is a foam sheet 32. The outer surface 33 of the foam sheet 32, opposite the back panel 30 may be coated with an adhesive layer 34. This adhesive is thermally activatable, by which is meant, the adhesive layer is non-sticky at room temperature and below but becomes increasingly sticky when heated above room temperature. Covering the adhesive layer 34 is a sheet of a backing material 36 which could be a fabric, vinyl sheet, or the like.

Alternatively, adhesive layer 34 may be omitted if the backing material is itself thermally sensitive. A thermally sensitive backing material is one that wilts at a sufficiently high temperature and is a stable solid at normal ambient temperatures. In this case, the envelope cover 10 is bonded directly to the backing material.

The envelope cover member 10 is telescoped open end 16 first over the cantilever support forming tool 12 to a position illustrated in FIG. 4 in which essentially the entire cover member 10 is supported on the forming tool 12. The second forming tool, not shown, is then lowered onto the envelope cover 10 so as to conform the top or front panel 28 of cover member 10 to the shape of the forming tool 12. The second forming tool and the forming tool 12 are of complimentary shapes so as to sandwich the cover member 10 therebetween and shape the fabric in the front panel 28 to the shape of the forming tool 12. Heat and pressure are applied to the forming tools to facilitate forming of the front panel 28 to the desired shape.

A fixture 42 which is eliminated from FIG. 4 for purposes of clarity is then lowered toward the shaped cover member 10 on the forming tool 12 with a foam pad 38 that has been molded to a desired shape and has been sprayed with an adhesive on its underside facing the envelope cover 10. The underside of the pad 38 has a surface that is shaped complimentary to the shape of the front panel 28 and the forming tool 12 and corresponding to the shape desired for the front panel of the seat back.

A lower fixture 44 is moved upward, pressing the back panel 30 of envelope cover member 10 and foam sheet 32 into the downwardly extending ribs 26 of forming tool 12. This is shown in FIG. 5. Heat is applied to the fixture 44 and/or forming tool 12 to activate the heat activated adhesive 34. The fixture 44 and the ribs 26 compress the foam sheet 32 such that the back panel 30 is in substantially line contact with the adhesive layer 34 at the regions of the ribs 26. This causes substantially line portions of the back panel 30 to be bonded to the backing material 36 by the adhesive 34. These line portions may be straight or curved. The bonding of the back panel 30 to the backing material 36 in the areas of the ribs 26 forms the contours in the back panel 30 of the envelope cover 10.

Alternatively, when the backing material 36 used is thermally sensitive, the adhesive layer 34 is not required. Ribs 26 of the forming tool 12 squeeze the foam sheet 32 such that the back panel 30 is pressed into substantially line contact with the backing material 36 along the ribs 26 as the lower fixture 44 is moved upward. Heat is then applied to portions of the fixture 44 or the ribs 26 to partially melt the backing material 36 causing the melt to penetrate and diffuse through the compressed foam and contact portion of the back pack panel 30. When cooled, the molten backing material 36 re-solidifies, bonding the back panel 30 to the backing material 36 along the lines of contact with ribs 26 to form the desired contours in the back panel 30.

The assembly consisting of the envelope cover 10, foam pad 38 and foam sheet 32 is then moved lengthwise off the cantilever end of the forming tool 12. The foam pad 38 and foam sheet 32 are of a size to be encloseable within the envelope cover 10 and as a result, the envelope cover 10 can be turned outside out so as to completely enclose the pad 38 and sheet 32 therein as shown in FIG. 6.

The resulting assembly can then be readily telescoped over a supporting seat back frame 46 to provide a desired seat back structure in which the foam pad 38 provided with the conforming cloth cover front panel portion 28 on its front side is positioned on the front side of the frame 46. The back of the frame 46 is covered by the foam sheet 32 and cloth cover back panel 30 having the stylized contour lines 48. A cross section of the completed assembly is shown in FIG. 8 with the assembly telescoped over the supporting frame 46 showing the back panel 30 having contour lines 48 therein.

It is to be understood that the invention is not limited to the exact construction or method illustrated and described above, but that various changes and modifications may be made without departing from the spirit and scope of the invention as defined in the following claims.

What is claimed:

1. A method of forming at least a portion of a seat utilizing a molded foam pad having a portion of its surface shaped, a supporting frame, and an envelope cover member for the pad and the frame, said cover being of generally tubular shape and having an open end, inner and outer surfaces, a front panel and back panel, comprising the steps of:

turning said envelope cover member inside out so that said inner surface is at the outside of said cover member;

telescoping said cover member open end first over a forming tool;

shaping at least a portion of said front panel by pressing said portion of said front panel against said forming tool;

positioning said foam pad on said inner surface of said envelope cover member so that said portion of the shaped surface of said pad is adjacent to said inner surface of said front panel and in complementary relation to the shape of said inner surface of said front panel;

adhering said portion of said pad to said complementary shaped inner surface of said front panel;

adhering a foam sheet to said inner surface of said back panel, the face of said foam sheet opposite said back panel having an adhesive layer coating covered by a backing material, said adhesive being a heat activated adhesive;

pressing portions of said seat back panel and said foam sheet against said forming tool to compress said foam sheet such that said portions of said back panel contact said adhesive;

applying heat to said heat activated adhesive to activate said adhesive thereby bonding said portions of said back panel to said backing material to form contours in said back panel;

removing said cover member from said forming tool; and manipulating said envelope cover member so that said outer surface is on the outside of said cover member and said foam pad and said foam sheet are enclosed therein and said envelope cover member can be telescoped open end first over said supporting frame.

2. The method according to claim 1 wherein said portions of said back panel are narrow substantially line portions.

3. A method of making a seat cover member having a contoured padded back panel, said seat cover member of generally tubular shape and having an open end, inner and outer surfaces and front and back panels, comprising the steps of:

turning said envelope cover member inside out to expose said inner surface of said cover member;

attaching a foam sheet to the inner surface of said back panel;

applying an adhesive layer to the side of said foam sheet opposite from said cover member;
covering said adhesive layer with a backing material;
applying pressure to said backing material and portions of said cover member compressing said foam pad such that said portions of said cover member contact said backing material and are adhesively bonded thereto;
turning said cover member outside out to expose said outer surface and enclose said foam sheet within said cover member.

4. The method of claim 3 wherein said adhesive layer is a thermally activatable adhesive and further comprising heating said adhesive whereby said adhesive is activated.

* * * * *